US007990512B2

(12) United States Patent
Yang

(10) Patent No.: US 7,990,512 B2
(45) Date of Patent: Aug. 2, 2011

(54) LIQUID CRYSTAL DISPLAY MODULE HAVING LIQUID CRYSTAL PANEL AND BACKLIGHT UNIT AND PRINTED CIRCUIT BOARD ON REAR FRAME

(75) Inventor: Seung-Hoon Yang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/549,065

(22) Filed: Aug. 27, 2009

(65) Prior Publication Data

US 2009/0316104 A1 Dec. 24, 2009

Related U.S. Application Data

(63) Continuation of application No. 11/451,896, filed on Jun. 13, 2006, now Pat. No. 7,599,020.

(30) Foreign Application Priority Data

Nov. 29, 2005 (KR) ............................ 2005-0114874

(51) Int. Cl.

*G02F 1/1345* (2006.01)
*G02F 1/1335* (2006.01)
*G02F 1/136* (2006.01)
*H02B 1/20* (2006.01)
*H02B 1/00* (2006.01)
*F21V 7/04* (2006.01)
*G09G 3/36* (2006.01)

(52) U.S. Cl. ........ 349/150; 349/149; 349/151; 349/152; 349/58; 349/61; 361/748; 361/749; 361/750; 361/751; 361/752; 361/600; 361/753; 362/611; 362/612; 362/613; 362/614; 362/615; 345/102; 345/104

(58) Field of Classification Search ............. 349/61–62, 349/65, 68, 150–151; 345/82; 257/88
See application file for complete search history.

(56) References Cited

U.S. PATENT DOCUMENTS 5,278,545 A * 1/1994 Streck .......................... 345/102
5,838,400 A * 11/1998 Ueda et al. ...................... 349/58
6,043,987 A * 3/2000 Goodwin et al. ............. 361/763
6,342,932 B1 1/2002 Terao et al.
6,473,146 B1 10/2002 Lee
6,561,663 B2 5/2003 Adachi et al.
2003/0164903 A1 9/2003 Saito et al.

* cited by examiner

*Primary Examiner* — Hoan C Nguyen
(74) *Attorney, Agent, or Firm* — Brinks Hofer Gilson & Lione

(57) ABSTRACT

A liquid crystal display module includes a liquid crystal display panel and a backlight unit under the liquid crystal display panel. The backlight unit includes at least one light emitting diode. The liquid crystal display module further comprises a bottom frame surrounding the backlight unit. The bottom frame comprises a printed circuit board and the at least one light emitting diode is disposed on the printed circuit board. The liquid crystal display module also includes a main frame surrounding the liquid crystal display panel and a top frame surrounding a front edge of the liquid crystal display panel and combined with the bottom frame through the main frame.

4 Claims, 4 Drawing Sheets

160 106 108 104 110 102 140 126 130 124 120 122 151 150

LIQUID CRYSTAL DISPLAY MODULE HAVING LIQUID CRYSTAL PANEL AND BACKLIGHT UNIT AND PRINTED CIRCUIT BOARD ON REAR FRAME

RELATED APPLICATIONS

The present patent document is a divisional of U.S. patent application Ser. No. 11/451,896, filed Jun. 13, 2006, which claims priority to Korean Patent Application No. 2005-0114874 filed in Korea on Nov. 29, 2005, which is hereby incorporated by reference.

BACKGROUND

1. Field of the Invention

The present invention relates to a liquid crystal display (LCD) module. More particularly, the present invention relates to a liquid crystal display (LCD) module having a liquid crystal panel and a backlight unit.

2. Description of the Related Art

As the information age advances, display devices for displaying information are actively being developed. More particularly, flat panel display (FPD) devices having a thin profile, light weight and low power consumption are actively being pursued to substitute cathode ray tube (CRT) devices. For example, a liquid crystal display (LCD) device, a plasma display panel (PDP), a field emission display (FED) device and an electroluminescent display (ELD) device have been researched and developed as an FPD device. Specifically, liquid crystal display (LCD) devices are widely used as monitors for notebook computers and desktop computers because of their high resolution, high contrast ratio, color rendering capability and superiority in displaying moving images.

A liquid crystal display (LCD) device relies on optical anisotropy and polarizability of liquid crystal molecules to produce an image. Due to the optical anisotropy of liquid crystal molecules, refraction of light incident onto the liquid crystal molecules depends on the alignment direction of the liquid crystal molecules. Liquid crystal molecules are aligned with directional characteristics resulting from their long, thin shapes. The alignment direction of the liquid crystal molecules can be controlled by applying an electric field thereto. An LCD panel includes two substrates and a liquid crystal layer interposed therebetween. The liquid crystal molecules are aligned according to the direction of an electric field generated between electrodes disposed on both substrates of the LC panel. By refracting and transmitting incident light and controlling the electric field applied to a group of liquid crystal molecules within particular pixel regions, a desired image can be obtained. However, because an LCD panel does not emit light, an LC module or an LCD device requires an additional light source. Accordingly, an LCD module includes a backlight unit disposed below an LCD panel to supply light.

In general, backlight units may be classified into two types according to a disposition of the light source, such as a side-type and a direct-type. In a side-type backlight unit, a light guide plate (LGP) is disposed at a rear of an LCD panel and a light source is disposed at a side of the LGP. Light emitted from the light source is refracted in the LGP and is supplied to the LCD panel. In a direct-type backlight unit, a plurality of light sources are disposed at a rear of an LCD panel, and light emitted from the plurality of light source is directly supplied to the LCD panel.

A cold cathode fluorescent lamp (CCFL) and an external electrode fluorescent lamp (EEFL) have been used as a light source of a backlight unit. Recently, a light emitting diode (LED) is suggested as a light source of a backlight unit because of its high color reproducibility and high brightness. A backlight unit using an LED as a light source may be referred to as an LED backlight unit.

FIG. 1 is a cross-sectional view showing a liquid crystal display module including a side-type light emitting diode backlight unit according to the related art. In FIG. 1, an LCD module includes an LCD panel 10, an LED backlight unit 20, a bottom frame 50, a main frame 40 and a top frame 60. The LCD panel 10 and the LED backlight unit 20 are modularized by a mechanism to prevent damage by an external impact and to minimize light loss. The main frame 40 surrounds the LCD panel 10 and the LED backlight unit 20. The bottom frame 50 surrounds the main frame 40 and covers a rear surface of the LED backlight unit 20. The top frame 60 surrounds a front edge of the LCD panel 10. The top frame 60 and the bottom frame 50 are combined through the main frame 40.

The LCD panel 10 includes first and second substrates 2 and 4, and a liquid crystal layer (not shown) is interposed between the first and second substrates 2 and 4. The LED backlight unit 20 includes a reflecting sheet 22, a light guide plate 24, a plurality of optic sheets 26 and a plurality of light emitting diodes (LEDs) 30. The reflecting sheet 22 is disposed on an inner surface of the bottom frame 50, and the light guide plate 24 is disposed on the reflecting sheet 22. The plurality of optic sheets 26 are disposed between the light guide plate 24 and the LCD panel 10. The plurality of LEDs 30 formed on a printed circuit board (PCB) 32 is disposed along a side surface 25 of the light guide plate 24.

Light emitted from each LED 30 passes through the side surface 25 of the light guide plate 24 and is refracted toward the LCD panel 10 in the light guide plate 24. While the refracted light and reflected light on the reflecting sheet 22 pass through the plurality of optic sheets 26, the light is treated to become plane light having high uniformity and high quality and is supplied to the LCD panel 10.

FIG. 2 is a magnified view of a portion “A” of FIG. 1. In FIG. 2, the plurality of LEDs 30 are disposed on the side surface 25 of the light guide plate 24. The plurality of LEDs 30 include red, green and blue (RGB) LEDs that are periodically arranged. The RGB LEDs are turned on together to generate white-colored light. To reduce a power consumption and circuit area, the plurality of LEDs 30 are formed on the PCB 32 as an array including several LEDs. The PCB 32 is fixed using an adhesive so that the plurality of LEDs 30 can face the side surface 25 of the light guide plate 24. Accordingly, the main frame 40 has a vertical surface 42 facing the side surface 25 of the light guide plate 24 and the PCB 32 is fixed to the vertical surface 42 of the main frame 40 using an adhesive 62 such as a double stick tape.

In addition, the LCD module includes a backlight driving circuit 70 (of FIG. 1) for driving and controlling the plurality of LEDs 30, and the backlight driving circuit 70 (of FIG. 1) is disposed on a rear surface of the bottom frame 50 (of FIG. 1) to minimize a volume of the LCD module. Accordingly, an additional connecting line 72 is required to electrically connect the PCB 32 having the plurality of LEDs 30 and the backlight driving circuit 70. The connecting line 72 extends from the PCB 32 through the main frame 40 or the bottom frame 50 to exterior to be connected to the backlight driving circuit 70.

An internal temperature of an LED abruptly increases according to a turn-on time, and the increase in temperature causes a change in brightness of the LED. FIG. 3 is a graph showing a relationship between internal temperature and brightness in an LED according to the related art. In FIG. 3, as the internal temperature of the LED increases, the brightness of the LED decreases with a different slope according to a color of the LED. For example, when the green LED has the internal temperature over 80° C., the brightness of the green LED is less than 80% of the brightness of the green LED having the internal temperature of 25° C. In addition, when the internal temperature of the green LED is over 120° C., the green LED does not emit light any more.

Accordingly, the design for heat radiation is a factor in use of an LED as a light source of a backlight unit. Specifically when a plurality of LEDs are disposed on a PCB, the increase in the internal temperature and the decrease in the brightness become severer. However, an LCD module according to the related art does not have an effective means for radiating heat generated in an LED, and the decrease in the brightness deteriorates a display quality. The adhesive 62 (of FIG. 2) for fixing the PCB 32 (of FIG. 2) may be formed of a heat-transmissive material for heat radiation. However, the effect of the heat-transmissive adhesive 62 (of FIG. 2) is not satisfactory. Moreover, due to the heat-transmissive adhesive 62 (of FIG. 2), the material cost increases and the fabrication process is complicated.

Referring again to FIG. 2, since the connecting line 72 is exposed outside the bottom frame 50 for connecting the PCB 32 inside the LCD module and the backlight driving circuit 70 outside the LCD module, the connecting line 72 may be cut or separated from the LCD module while the LCD module is transported or used. In addition, since a through hole is formed in the bottom frame 50 and the main frame 40 for extending the connecting line 72 from inside to outside of the LCD module, an additional forming step for the through hole is required in fabrication process.

BRIEF SUMMARY

Accordingly, the present invention is directed to a liquid crystal display device that substantially obviates one or more problems due to limitations and disadvantages of the related art.

An advantage of the present invention is to provide a liquid crystal display module where a heat generated in an LED is effectively radiated.

Another advantage of the present invention is to provide a liquid crystal display module where a connection between an LED and a backlight driving circuit is improved.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

A liquid crystal display module includes a liquid crystal display panel and a backlight unit under the liquid crystal display panel. The backlight unit includes at least one light emitting diode. The liquid crystal display module further comprises a bottom frame surrounding the backlight unit, which comprises a printed circuit board, and the at least one light emitting diode disposed on the printed circuit board. The liquid crystal display module include a main frame surrounding the liquid crystal display panel and a top frame surrounding a front edge of the liquid crystal display panel and combined with the bottom frame through the main frame.

A method of fabricating a liquid crystal display module comprises providing a backlight unit that includes at least one light emitting diode in a liquid crystal display panel and forming a bottom frame that surrounds the backlight unit, wherein the bottom frame comprises a printed circuit board and the at least one light emitting diode is disposed on the printed circuit board. The method of fabricating a liquid crystal display module further comprises forming a main frame that surrounds the liquid crystal display panel and forming a top frame that surrounds a front edge of the liquid crystal display panel and is combined with the bottom frame through the main frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE DRAWINGS AND THE PRESENTLY PREFERRED EMBODIMENTS

Reference will now be made in detail to an embodiment of the present invention, an example of which is illustrated in the accompanying drawings.

Figure 1:
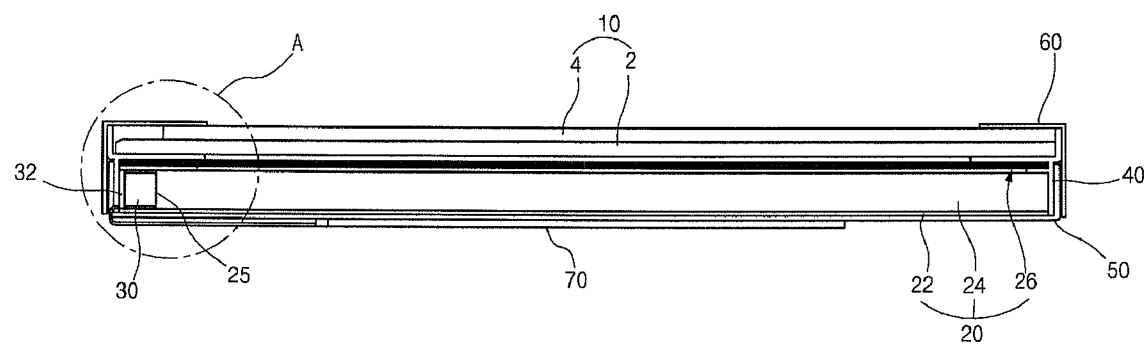
FIG. 1 is a cross-sectional view showing a liquid crystal display module including a side-type light emitting diode backlight unit according to the related art.
Figure 2:
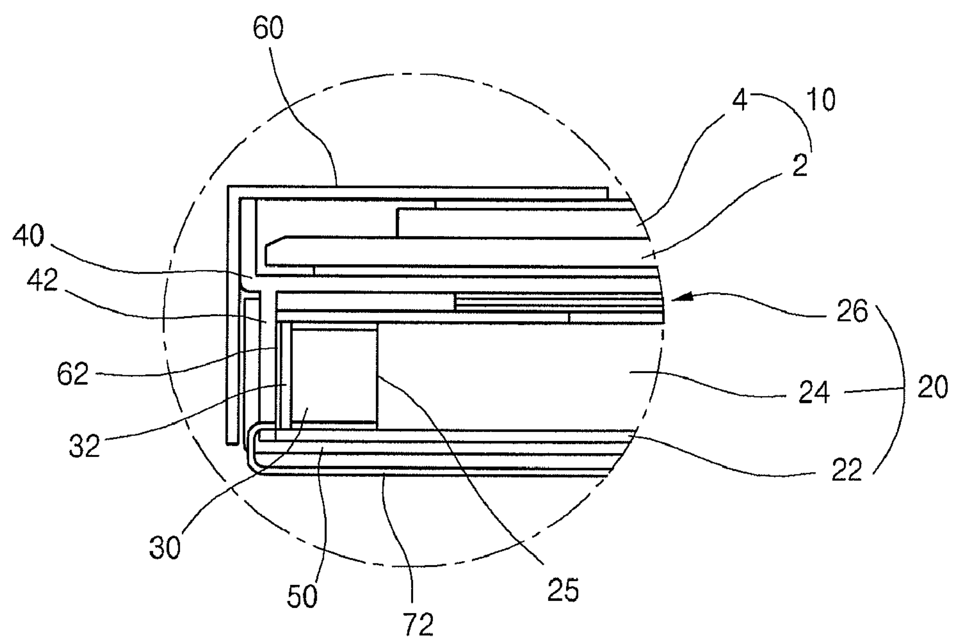
FIG. 2 is a magnified view of a portion “A” of FIG. 1.
Figure 3:
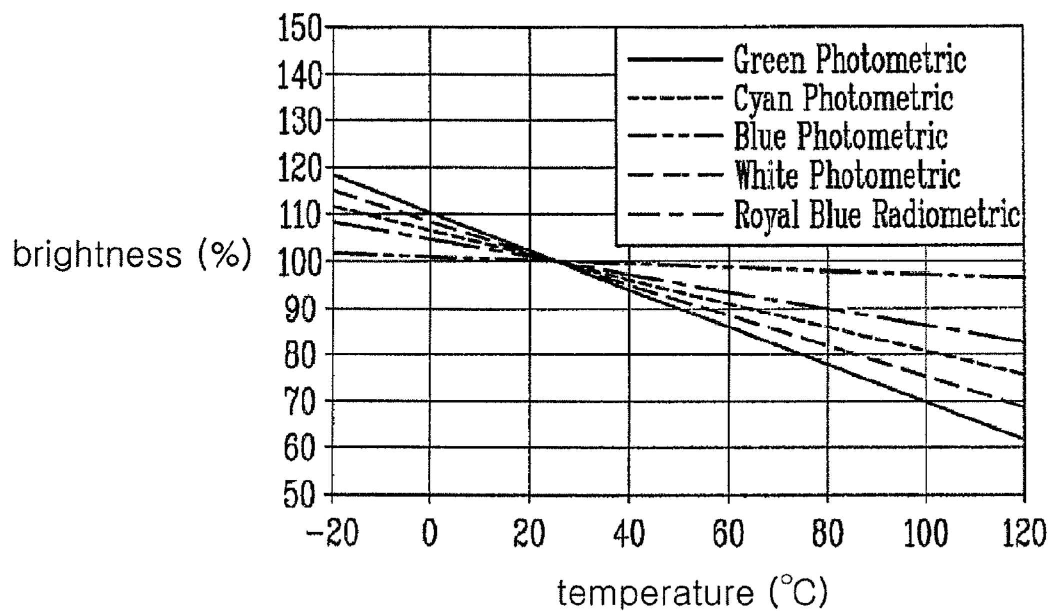
FIG. 3 is a graph showing a relationship between internal temperature and brightness in an LED according to the related art.
Figure 4:
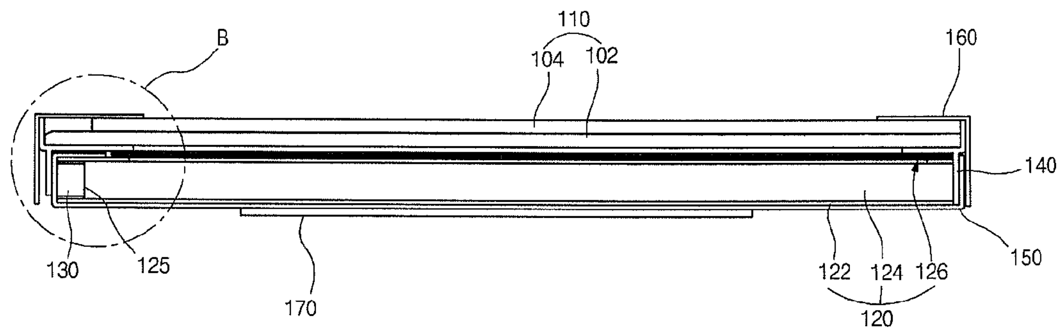
FIG. 4 is a cross-sectional view showing a liquid crystal display module according to a first embodiment of the present invention.

FIG. 4 is a cross-sectional view showing a liquid crystal display module according to a first embodiment of the present invention. The liquid crystal display module of FIG. 4 has a side-type backlight unit.

In FIG. 4, an LCD module includes an LCD panel 110, an LED backlight unit 120, a main frame 140, a bottom frame 150, a top frame 160 and a backlight driving circuit 170. The LCD panel 110 and the LED backlight unit 120 are modularized by a mechanism to prevent damage caused by an external impact and to minimize light loss. The main frame 140 surrounds the LCD panel 110 and the LED backlight unit 120. The bottom frame 150 surrounds the main frame 140 and covers a rear surface of the LED backlight unit 120. The top frame 160 surrounds a front edge of the LCD panel 110. The top frame 160 and the bottom frame 150 are combined through the main frame 140. The backlight driving circuit 170 is disposed on an outer surface of the bottom frame 150.

The LCD panel 110 includes first and second substrates 102 and 104, and a liquid crystal layer (not shown) is interposed between the first and second substrates 102 and 104. A transmittance difference for displaying images is generated in the LCD panel 110, and the LCD panel 110 may have an active matrix type where a switching element is disposed in each pixel region. Even though not shown in FIG. 4, a plurality of gate lines and a plurality of data lines are formed on the first substrate 102, and the gate line crosses the data line to define a pixel region. A thin film transistor (TFT) as a switching element is connected to the gate line and the data line, and a pixel electrode is connected to the TFT. In addition, a black matrix corresponding to the gate line, the data line and the TFT is formed on the second substrate 104, and a color filter layer including red, green and blue color filters is formed on the black matrix. A common electrode is formed on the color filter layer. The pixel electrode and the common electrode may include a transparent conductive material. The first substrate 102 and the second substrate 104 may be referred to as an array substrate and a color filter substrate, respectively.

In addition, a panel driving circuit is disposed along at least one side of the LCD panel 110. The panel driving circuit includes a gate driver and a data driver along two adjacent sides of the LCD panel 110. The gate driver sequentially transmits scan signals turning on/off the TFT to the plurality of gate lines, and the data driver transmits image signals to the plurality of the data lines. As a result, when the TFT is turned on according to the scan signals transmitted from the gate driver through the plurality of gate lines, the image signals are transmitted to the pixel electrode through the plurality of data lines. Due to the image signal, an electric field is generated between the pixel electrode and the common electrode, and liquid crystal molecules in the liquid crystal layer are re-arranged according to the electric field to generate the transmittance difference.

The LED backlight unit 120 is disposed under the LCD panel 110 and supplies light to the LCD panel 110 to project the transmittance difference into exterior. The LED backlight unit 120 includes a reflecting sheet 122, a light guide plate 124, a plurality of optic sheets 126 and a plurality of light emitting diodes (LEDs) 130. The reflecting sheet 122 is disposed on an inner surface of the bottom frame 150, and the light guide plate 124 is disposed on the reflecting sheet 122. The plurality of optic sheets 126 are disposed between the light guide plate 124 and the LCD panel 110. The plurality of LEDs 130 are disposed on a side surface 125 of the light guide plate 124.

Light emitted from each LED 130 passes through the side surface 125 of the light guide plate 124 and is refracted toward the LCD panel 110 in the light guide plate 124. While the refracted light and reflected light on the reflecting sheet 122 pass through the plurality of optic sheets 126, the light is treated to become plane light having high uniformity and high quality and then is supplied to the LCD panel 110.

The bottom frame 150 covers and surrounds the reflecting sheet 122 and the light guide plate 124. In addition, the bottom frame 150 functions as a bottom surface of a case supporting the LCD module. Specifically, the bottom frame 150 is formed of a printed circuit board (PCB). Accordingly, the plurality of LEDs 130 are formed directly on an edge portion of the bottom frame 150.

Figure 5:
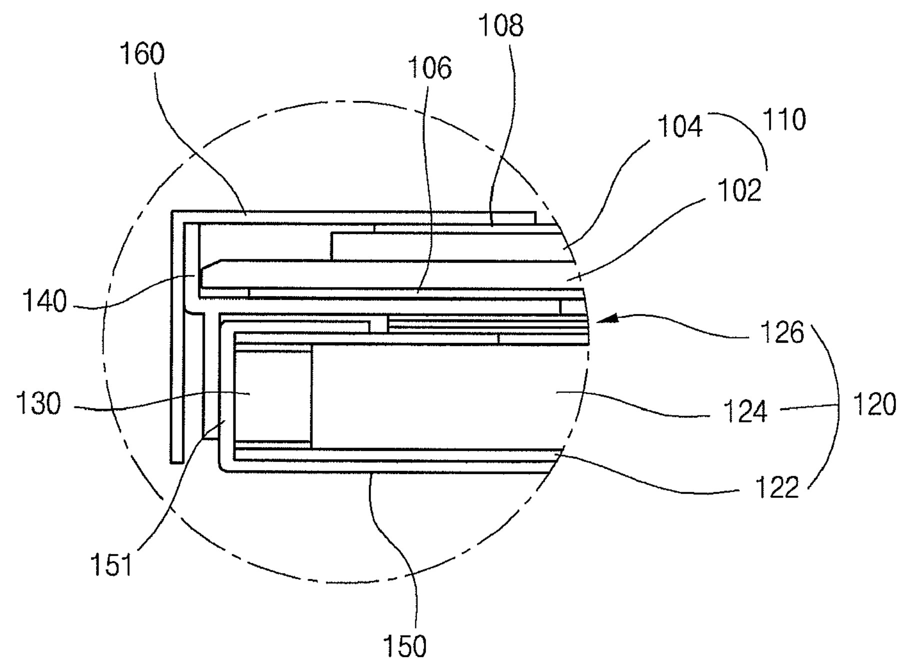
FIG. 5 is a magnified view of a portion “B” of FIG. 4.

FIG. 5 is a magnified view of a portion "B" of FIG. 4.

In FIG. 5, the bottom frame 150 covers and surrounds the reflecting sheet 122 and the light guide plate 124. An edge portion of the bottom frame 150 corresponding to the side surface 125 of the light guide plate 124 is upwardly bent and then is inwardly bent to provide a vertical surface 151 facing the side surface 125. Since the bottom frame 150 is formed of a PCB, the plurality of LEDs 130 are disposed directly on the vertical surface 151 of the bottom frame 150 without using an additional PCB. For example, the bottom frame may include metal core printed circuit board (MCPCB). In addition, first and second polarizing plates 106 and 108 are formed on outer surfaces of the LCD panel 110, respectively.

The PCB for the bottom frame 150 may be an electric circuit plate, wherein conductive lines are formed on an insulating substrate of resin or ceramic through a photolithographic process, thereby electric elements disposed thereon and connected to each other. The PCB may be referred to as a printed wiring board (PWB). The MCPCB, which is a special PCB having a heat-radiation function, includes a metal core layer, an insulating layer and conductive lines. The metal core layer includes a heat-transmissive material such as aluminum (Al), and the insulating layer is formed on at least one surface of the metal core layer. The conductive lines are formed on the insulating layer. Since the metal core layer of a heat-transmissive material is formed in the MCPCB, the MCPCB has a heat-transmittance higher than the PCB. Accordingly, heat is effectively radiated and electric elements have uniform temperature distribution in the MCPCB.

In the LCD module according to the present invention, since the bottom frame 150 is formed of a PCB, the bottom frame 150 has an original function of supporting the LCD panel 110 and the backlight unit 120 to prevent damage by an external impact and minimize light loss and an additional function of supporting and electrically connecting the plurality of LEDs 130.

Figure 6:
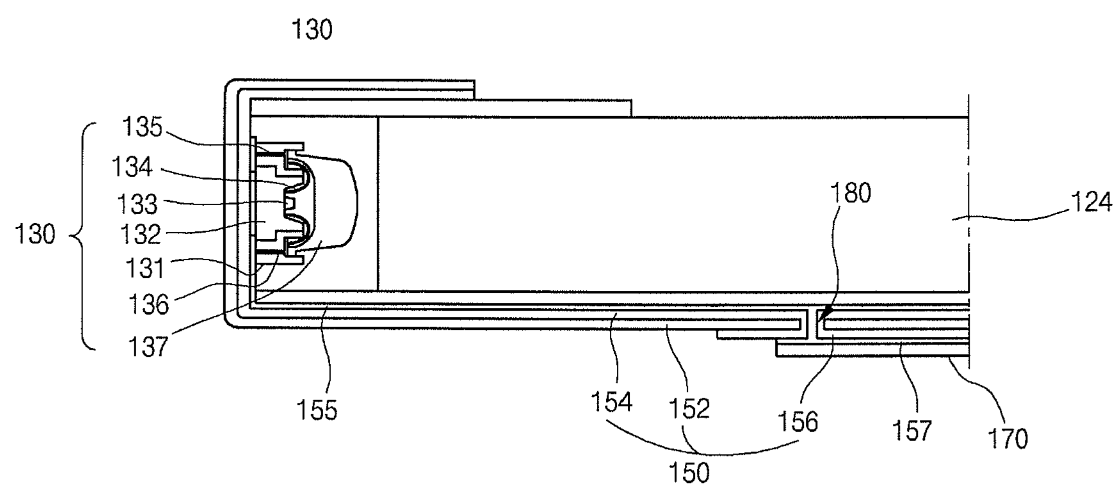
FIG. 6 is a cross-sectional view showing a bottom frame formed of an MCPCB for a liquid crystal display module according to a first embodiment of the present invention.

FIG. 6 is a cross-sectional view showing a bottom frame formed of an MCPCB for a liquid crystal display module according to a first embodiment of the present invention. For illustration, a single LED is shown in FIG. 6.

In FIG. 6, an LED 130 is disposed on a bottom frame 150, which surrounds a light guide plate 124. The LED 130 includes a case 131, heat-radiation slug 132, an LED chip 133, a wire 134, a cathode lead 135, an anode lead 136 and a lens 137. The case 131 functions as a main body of the LED 130, and the heat-radiation slug 132 in the case 131 provides a space for the LED chip 133. The anode lead 136 and the cathode lead 137 are connected to the LED chip 133 through the wire 134 and are exposed to an exterior of the LED 130. The lens 137 is disposed over the case 131 to protect the LED chip 133 and the wire 134 and improve light efficiency.

The bottom frame 150 includes a metal core layer 152, a first insulating layer 154 and a first conductive line 155. The metal core layer 152 is electrically insulated from the LED 130 by the first insulating layer 154 formed on one surface of the metal core layer 152. The first conductive line 155 is formed on the first insulating layer 154 and electrically connected to the cathode and anode leads 135 and 136 of the LED 130 by a connection method such as soldering. As a result, the bottom frame 150 functions both as a frame and as a MCPCB. Accordingly, a plurality of LEDs are disposed directly on the vertical surface 151 (of FIG. 5) of the bottom frame 150 and constitute an LED array where the plurality of LEDs are electrically connected to one another. In addition, heat generated in the LED 130 is rapidly and effectively radiated through the heat-radiation slug 132 and the metal core layer 152 because the metal core layer 152 has an extended area similar to the whole bottom frame 150.

Furthermore, since the bottom frame 150 is formed of the MCPCB, a backlight driving circuit 170 is disposed directly on the bottom frame 150. Since the LED 130 and the backlight driving circuit 170 are disposed on the single MCPCB, the LED 130 and the backlight driving circuit 170 are electrically connected to each other without an additional connecting line.

Referring again to FIG. 6, the bottom frame 150 further includes a second insulating layer 156 on the other surface of the metal core layer 152 and a second conductive line 157 on the second insulating layer 156. The backlight driving circuit 170 is disposed on and electrically connected to the second conductive line 157. The metal core layer 152 has a contact hole 180. Since the first and second insulating layers 154 and 156 are formed on an inner surface of the contact hole 180, the first and second conductive lines 155 and 157 are electrically connected to each other through the contact hole 180 and electrically insulated from the metal core layer 152. Accordingly, the LED 130 is connected to the backlight driving circuit 170 through the first and second conductive lines 155 and 157, and an additional connecting line for connecting the LED 130 and the backlight driving circuit 170 is not required.

Even though not shown in FIG. 6, the metal core layer may have a plurality of contact holes. In addition, a plurality of first conductive lines and a plurality of second conductive lines may be formed on the first and second insulating layers, respectively. Accordingly, even when a plurality of LED arrays are disposed on the bottom frame, each LED array may be electrically connected to the backlight driving circuit individually. Moreover, the MCPCB may include one of a single-side PCB, a double-side PCB, multi-layer PCB and a combination PCB.

Figure 7:
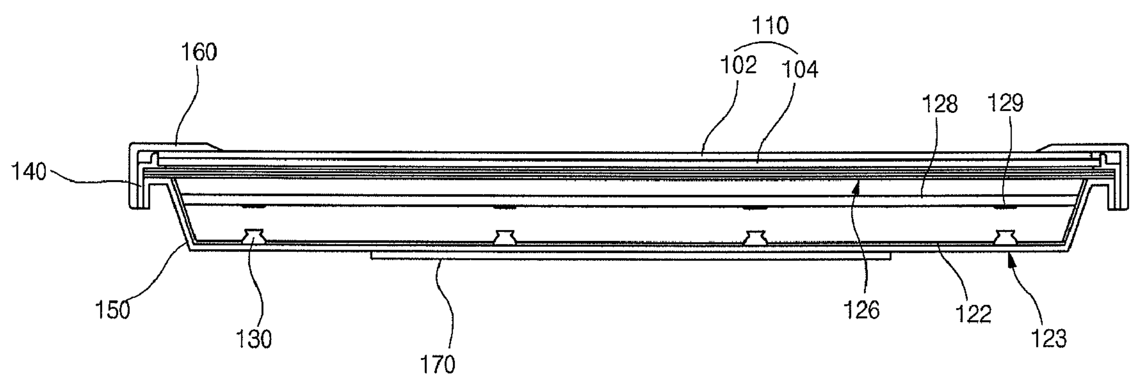
FIG. 7 is a cross-sectional view showing a liquid crystal display module according to a second embodiment of the present invention.

FIG. 7 is a cross-sectional view showing a liquid crystal display module according to a second embodiment of the present invention. The liquid crystal display module of FIG. 7 has a direct-type backlight unit. In FIG. 7, elements having the same function as those of FIG. 4 may be designated with the same reference numbers and illustrations for the elements are omitted.

In FIG. 7, a plurality of LEDs 130 are disposed over an inner surface of a bottom frame 150. The plurality of LEDs 130 may form lines parallel to each other. A reflecting sheet 122 is disposed between the plurality of LEDs 130 and the bottom frame 150. The reflecting sheet 122 includes a plurality of through holes 123 corresponding to the plurality of LEDs 130 and covers the bottom frame 150. A transparent window 128 is disposed over the plurality of LEDs 130, and a plurality of reflecting dots 129 are formed on a rear surface of the window 128 to correspond to the plurality of LEDs 130. A plurality of optic sheets 126 is disposed over the window 128. Light emitted from the plurality of LEDs 130 and light reflected on the reflecting sheet 122 are dispersed by the plurality of reflecting dots 129 and are treated to become plane light having high uniformity and high quality while passing through the plurality of optic sheets 126. Accordingly, the plane light is supplied to the LCD panel 110.

Since the bottom frame 150 is formed of a PCB, for example, an MCPCB, the plurality of LEDs 130 are disposed directly on the bottom frame 150. In addition, a backlight driving circuit 170 for driving and controlling the plurality of LEDs 130 is disposed directly on an outer surface of the bottom frame 150. The backlight driving circuit 170 is electrically connected to the plurality of LEDs 130 through the bottom frame 150 without an additional connecting line.

Consequently, since a bottom frame of a liquid crystal display module is formed of a PCB such as an MCPCB, heat generated from an LED is effectively radiated and display quality is improved. In addition, since a backlight driving circuit is electrically connected to an LED without an additional connecting line, deterioration due to a connecting line is prevented and fabrication process is simplified. Moreover, since a backlight driving circuit is integrated into a bottom frame, whole volume and production cost of a liquid crystal display device are reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method of fabricating a liquid crystal display module, comprising:

providing a backlight unit including at least one light emitting diode in a liquid crystal display panel;

forming a bottom frame surrounding the backlight unit, wherein the bottom frame comprises a printed circuit board and the at least one light emitting diode is disposed on the printed circuit board;

forming a main frame surrounding the liquid crystal display panel;

forming a top frame surrounding a front edge of the liquid crystal display panel and is combined with the bottom frame through the main frame; and forming a backlight driving circuit on an outer surface of the bottom frame and electrically connected to the at least one light emitting diode, wherein the bottom frame is formed of a metal core printed circuit board comprising:

a metal core layer electrically insulated from the at least one light emitting diode;

a first insulating layer on a first surface of the metal core layer;

a first conductive line on the first insulating layer and electrically connected to the at least one light emitting diode, a second insulating layer on a second surface of the metal core layer; and a second conductive line on the second insulating layer and electrically connected to the backlight driving circuit, and wherein the metal core layer has at least one contact hole penetrating the metal core layer, and the first and second insulating layers are formed on an inner surface of the at least one contact hole.

2. The method according to claim 1, wherein the at least one light emitting diode is disposed over an inner surface of the bottom frame.

3. The method according to claim 2, wherein the backlight unit further comprises:

a reflecting sheet covering the inner surface of the bottom frame, and has at least one through hole, wherein the at least one light emitting diode is exposed through the at least one through hole;

a transparent window over the at least one light emitting diode;

at least one reflecting dot on the transparent window, wherein the at least one reflecting dot faces and corresponds to the at least one light emitting diode; and a plurality of optic sheets between the transparent window and the liquid crystal display panel.

4. The method according to claim 1, wherein the first and second conductive line are electrically connected to each other through the at least one contact hole.

* * * * *